United States Patent
Mueller et al.

(10) Patent No.: US 10,267,442 B2
(45) Date of Patent: Apr. 23, 2019

(54) HOSE CLAMP

(71) Applicant: Oetiker Schweiz AG, Horgen (CH)

(72) Inventors: Manuel Mueller, Staffeln (CH); Willi Haensli, Horgen (CH); Klaus Schwaiger, Lufingen (CH)

(73) Assignee: Oetiker Schweiz AG, Horgen (CH)

( * ) Notice: Subject to any disclaimer, the term of this patent is extended or adjusted under 35 U.S.C. 154(b) by 0 days.

(21) Appl. No.: 15/741,391

(22) PCT Filed: Jul. 3, 2015

(86) PCT No.: PCT/EP2015/065259
§ 371 (c)(1),
(2) Date: Jan. 2, 2018

(87) PCT Pub. No.: WO2017/005283
PCT Pub. Date: Jan. 12, 2017

(65) Prior Publication Data
US 2018/0187808 A1    Jul. 5, 2018

(51) Int. Cl.
*F16L 33/025*    (2006.01)
*F16L 33/035*    (2006.01)

(52) U.S. Cl.
CPC .......... *F16L 33/025* (2013.01); *F16L 33/035* (2013.01)

(58) Field of Classification Search
CPC ......... F16B 2/08; F16L 33/025; F16L 33/035; Y10T 24/1457; Y10T 24/1478; Y10T 24/1488
See application file for complete search history.

(56) References Cited

U.S. PATENT DOCUMENTS

| 4,299,012 A | * | 11/1981 | Oetiker | ............... | B65D 63/02 |
| | | | | | 24/19 |
| 5,669,113 A | * | 9/1997 | Fay | ............... | B65D 63/04 |
| | | | | | 24/20 CW |
| 5,881,437 A | | 3/1999 | Lilley | | |
| 8,230,556 B2 | * | 7/2012 | Dominguez | .......... | F16L 33/025 |
| | | | | | 24/20 CW |
| 2002/0104197 A1 | | 8/2002 | Craig, Jr. | | |

FOREIGN PATENT DOCUMENTS

| EP | 0523600 | 1/1993 |
| EP | 0777075 | 6/1997 |
| WO | WO2007/128334 | 11/2007 |

* cited by examiner

*Primary Examiner* — Jack W Lavinder
(74) *Attorney, Agent, or Firm* — Simpson & Simpson, PLLC

(57) ABSTRACT

A diameter variable hose clamp includes a clamping band having end portions which mutually overlap in the closed condition of the hose clamp. The inner end portion carries a tongue which has a width smaller than the full width of the clamping band, and hooks for closing of the hose clamp. The outer end portion is provided with openings for receiving the hooks, an ear-like tightening device for tightening the hose clamp around an object to be clamped, and an arcuate band portion for receiving the tongue. The arcuate band portion is cut free from the clamping band by longitudinal cuts in forming lateral band webs.

8 Claims, 3 Drawing Sheets

HOSE CLAMP

CROSS-REFERENCE TO RELATED APPLICATIONS

The present application is the United States National Stage Application pursuant to 35 U.S.C. § 371 of International Patent Application No. PCT/EP2015/065259, filed on Jul. 3, 2015, which application is incorporated by reference in its entirety.

FIELD

The present disclosure relates to hose clamps, in particular, to a hose clamp having a tightening device for tightening the hose clamp around an object to be clamped.

BACKGROUND

Hose clamps, such as those used for connecting a hose to a pipe nipple, are mostly made with such a predetermined rated diameter that the inner surface of the clamping band contacts the hose throughout the entire periphery without gaps and a continuously uniform sealing pressure is achieved between the hose and the pipe nipple.

Known from EP 0 697 554 A and WO 2007/128334 A are hose clamps in which the inner end portion of the clamping band is formed with a tongue, which has a width smaller than the full width of the clamping band, and hooks for closing the hose clamp, and the outer end portion has openings for engaging the hooks and an ear-like tightening device for tightening the hose clamp around an object to be clamped. Further provided in the outer end portion of the clamping band is an arcuate band portion for receiving the tongue, the arcuate band portion being cut free from the clamping band by longitudinal cuts, which leave lateral band webs and starting at a step formed in the clamping band, the step corresponding to the thickness of the clamping band.

The length of the tongue is so designed that in a closed, not yet tightened condition of the hose clamp, the tip of the tongue traverses the step by some length and is guided by the lateral band webs, whereas in the tightened condition, the full band width must not reach the step. Thus, the length of the tongue must be at least equal to the peripheral difference between the non-tightened and the tightened hose clamp.

EP 0 657 676 A2 discloses a hose clamp in which the outer clamping band portion has an elongated window with a stop edge, and the inner clamping band portion has a tongue with a series of hooks, one of which engages the stop edge in the tightened condition of the hose clamp. While this hose clamp is principally usable for a variety of diameters, there is always an area left between the inner end of the tongue and the outer end of the window where the hose is supported by only by the narrower tongue and the sealing pressure is correspondingly reduced.

Otherwise, screw clamps are known, e.g., from EP 0 523 600 A, as diameter adjustable clamps which are substantially more expensive to manufacture and to mount.

SUMMARY

It is a general object of the present disclosure to overcome at least some of the disadvantages that exist with comparable prior art hose clamps. A more specific object of the present disclosure may be seen to reside in providing a universal hose clamp that can be used for a variety of diameters yet ensures sealing substantially across the entire width of the clamping band irrespective of the clamping band width.

In the present disclosure, the only purpose of the tongue is to guide the mutually overlapping ends of the clamping band so as to avoid lateral deviations. Therefore, the tongue may be short to save material. At the same time, means to reinforce the tongue against buckling are dispensable. Such means are required with larger clamp diameters and the corresponding higher forces occurring. Due to the absence of a step within the clamping band, the hose clamp of the present disclosure can be manufactured more simply using simpler tools.

For large clamp diameters and a large range of diameter variation, it is advantageous if the arcuate band portion is continuous with the lateral band webs at least at one intermediate location.

If the openings are circular they are easy to manufacture and are particularly strong.

In another advantageous embodiment, the hooks include a securing hook for securing the hose clamp against inadvertent openings, and at least one support hook for positively interconnecting the two end portions in the tightened condition of the hose clamp.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
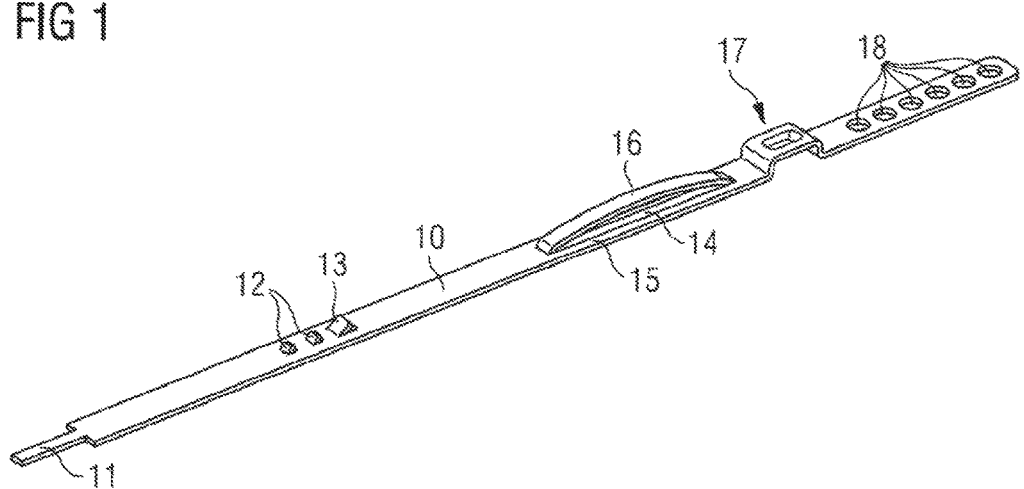
FIG. 1 is a perspective view of a hose clamp in a non-bent condition.
Figure 2:
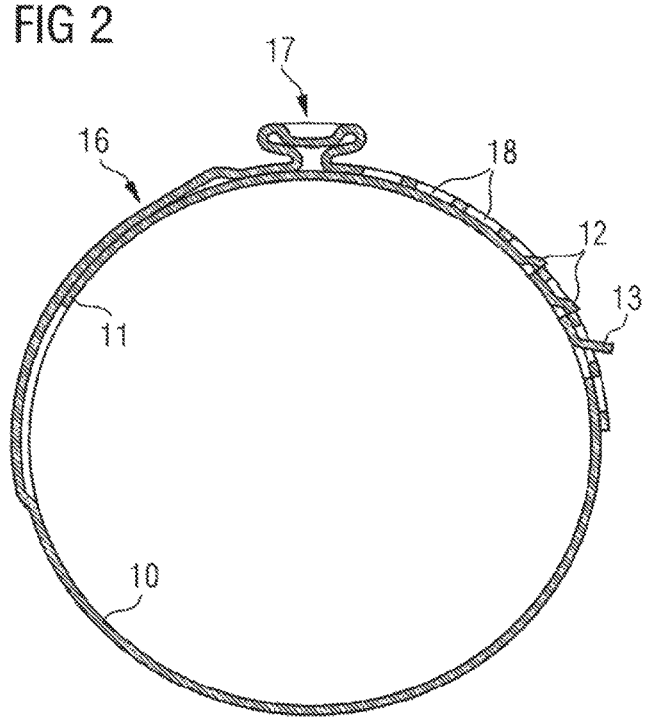
FIG. 2 is a cross-sectional view of the hose clamp of FIG. 1 in the closed and tightened condition.
Figure 3:
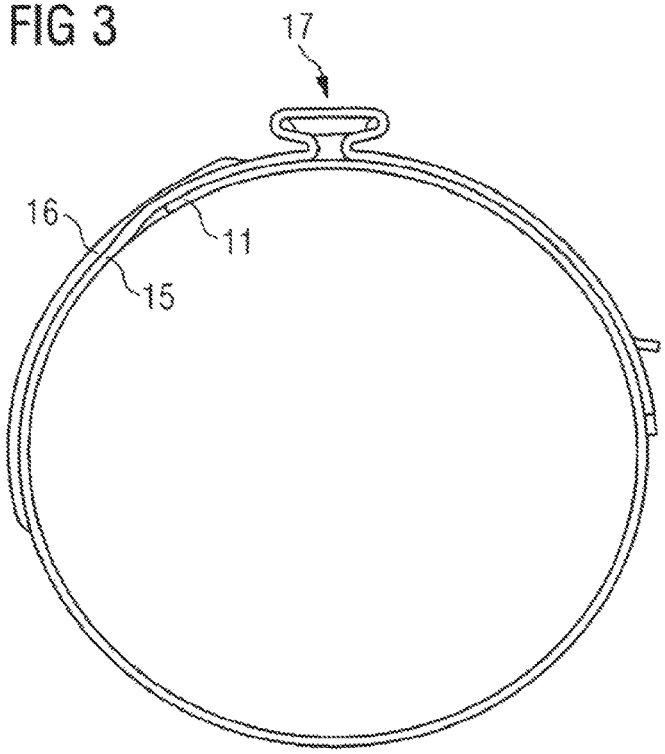
FIG. 3 is a side view of the hose clamp of FIG. 1 in the closed and tightened condition.
Figure 4:
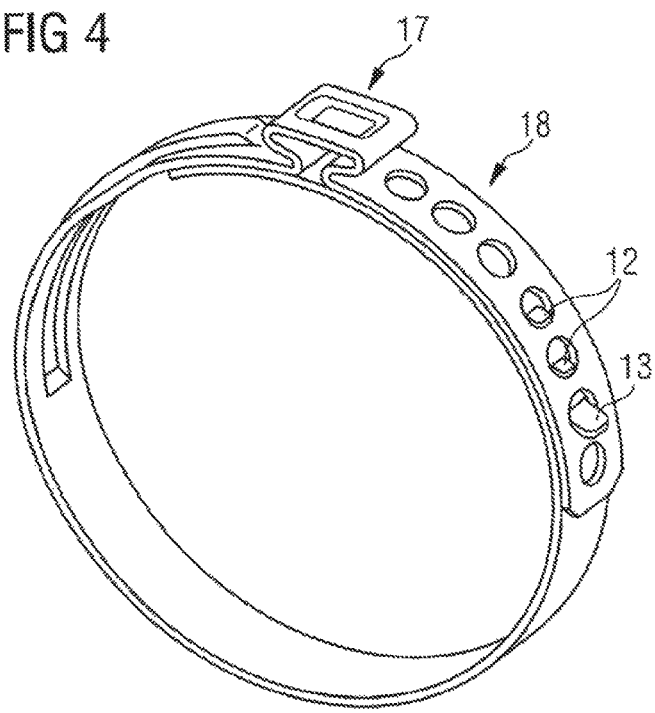
FIG. 4 is a perspective view of the hose clamp of FIG. 1 in the closed and tightened condition.
Figure 5:
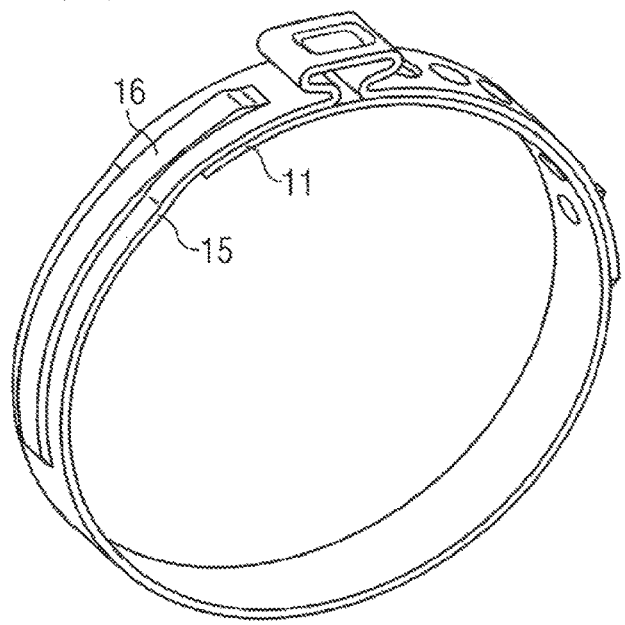
FIG. 5 is a perspective view of the hose clamp of FIG. 1 in the closed and tightened condition.

The hose clamp represented in the drawings comprises open clamping band 10 which, starting from the inner end portion shown at the lower left in FIG. 1, includes tongue 11, two support hooks 12, and securing hook 13 on the side which is the outer side in the closed condition of the hose clamp, arcuate band portion 16 which is cut free from clamping band 10 by two parallel longitudinal cuts 14 leaving lateral band webs 15, tightening device 17 in the form of a so-called "Oetiker® ear" having a pair of outward bent legs interconnected by a web reinforced by a bead, and, at the other, outer end portion, a series of circular openings 18 for receiving support hooks 12 and securing hook 13.

In use, the hose clamp, which is pre-bent by the manufacturer and is still open, is placed around the object to be clamped, such as a pipe nipple surrounded by a hose, whereby tongue 11 comes to lie between lateral band webs 15 under arcuate band portion 16. Then, securing hook 13 is inserted into opening 18 which corresponds to the diameter of the object to be clamped whereby support hooks 12 engage adjacent openings 18. The hose clamp is subsequently tightened by narrowing the ear of tightening device 17 using a pliers-type tool. Securing hook 13 secures the end portions of the clamping band against lateral deviations; the support hooks ensure the force flow.

When being tightened, tongue 11 is pressed by arcuate band portion 16, in the position corresponding to the respective diameter, to the level of inner clamping band 10. Lateral band webs 15 are simultaneously drawn toward the object being clamped due to tensile force existing in clamping band 10 and the curvature of the hose clamp, thereby ensuring, in combination with tongue 11, a substantially uniform and gapless sealing force throughout the periphery.

Figure 6:
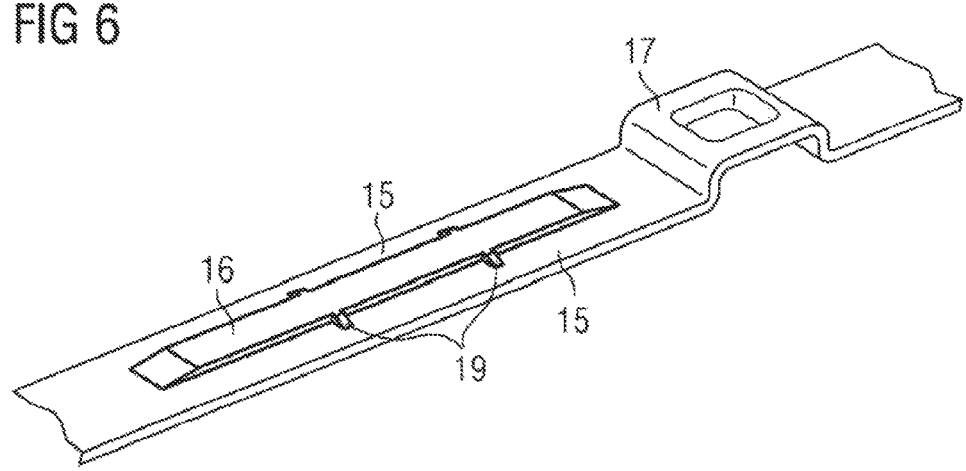
FIG. 6 is a partial perspective view showing a variation of the hose clamp of FIG. 1; and, FIG. 7 is a partial perspective view showing a variation of the hose clamp of FIG. 1.
Figure 7:
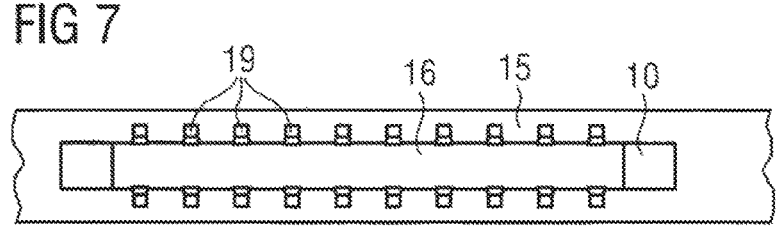

As shown in FIGS. 6 and 7, parallel longitudinal cuts 14 may be interrupted at a plurality of locations 19 (or at only one location) where arcuate band portion 16 is continuous with lateral band webs 15. This feature can be useful with large hose clamp diameters or a large range of diameter variation in order to make sure that arcuate band portion 16 tightly draws tongue 11 toward the object to be clamped.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 10 clamping band
11 tongue
12 support hooks
13 securing hook
14 longitudinal sections
15 band webs
16 arcuate band portion
17 tightening device
18 opening
19 connecting locations

What is claimed is:

1. A hose clamp made of a clamping band, comprising:
an inner end portion which overlaps an outer end portion in a closed condition of the hose clamp, wherein:
the inner end portion comprises:
a tongue including a first width, the first width being smaller than a second width of the clamping band; and,
one or more hooks for closing the hose clamp; and, the outer end portion comprises:
one or more openings for receiving the one or more hooks;
a tightening device operatively arranged to tighten the hose clamp around an object to be clamped; and,
an arcuate band portion for receiving the tongue, the arcuate band portion being cut free from the clamping band by longitudinal cuts forming lateral band webs, wherein:
the number of openings is greater than the number of the hooks; and,
the clamping band is free of steps with the exception of the tightening device.

2. The hose clamp as recited in claim 1, wherein the longitudinal cuts are interrupted at at least one intermediate location at which the arcuate band portion is continuous with the lateral band webs.

3. The hose clamp as recited in claim 2, wherein the openings are circular.

4. The hose clamp of claim 3, wherein the hooks include a securing hook for securing the hose clamp against inadvertent opening, and at least one support hook for positively interconnecting both end portions.

5. The hose clamp of claim 1, wherein the one or more hooks include a securing hook for securing the hose clamp against inadvertent opening, and at least one support hook for positively interconnecting both end portions.

6. The hose clamp of claim 2, wherein the hooks include a securing hook for securing the hose clamp against inadvertent opening, and at least one support hook for positively interconnecting both end portions.

7. The hose clamp as recited in claim 1, wherein the openings are circular.

8. The hose clamp of claim 7, wherein the hooks include a securing hook for securing the hose clamp against inadvertent opening, and at least one support hook for positively interconnecting both end portions.

* * * * *